INVENTOR.
LYLE E. OSBORNE
JAMES P. WHITE
BY
*William N. Antonis*
ATTORNEY.

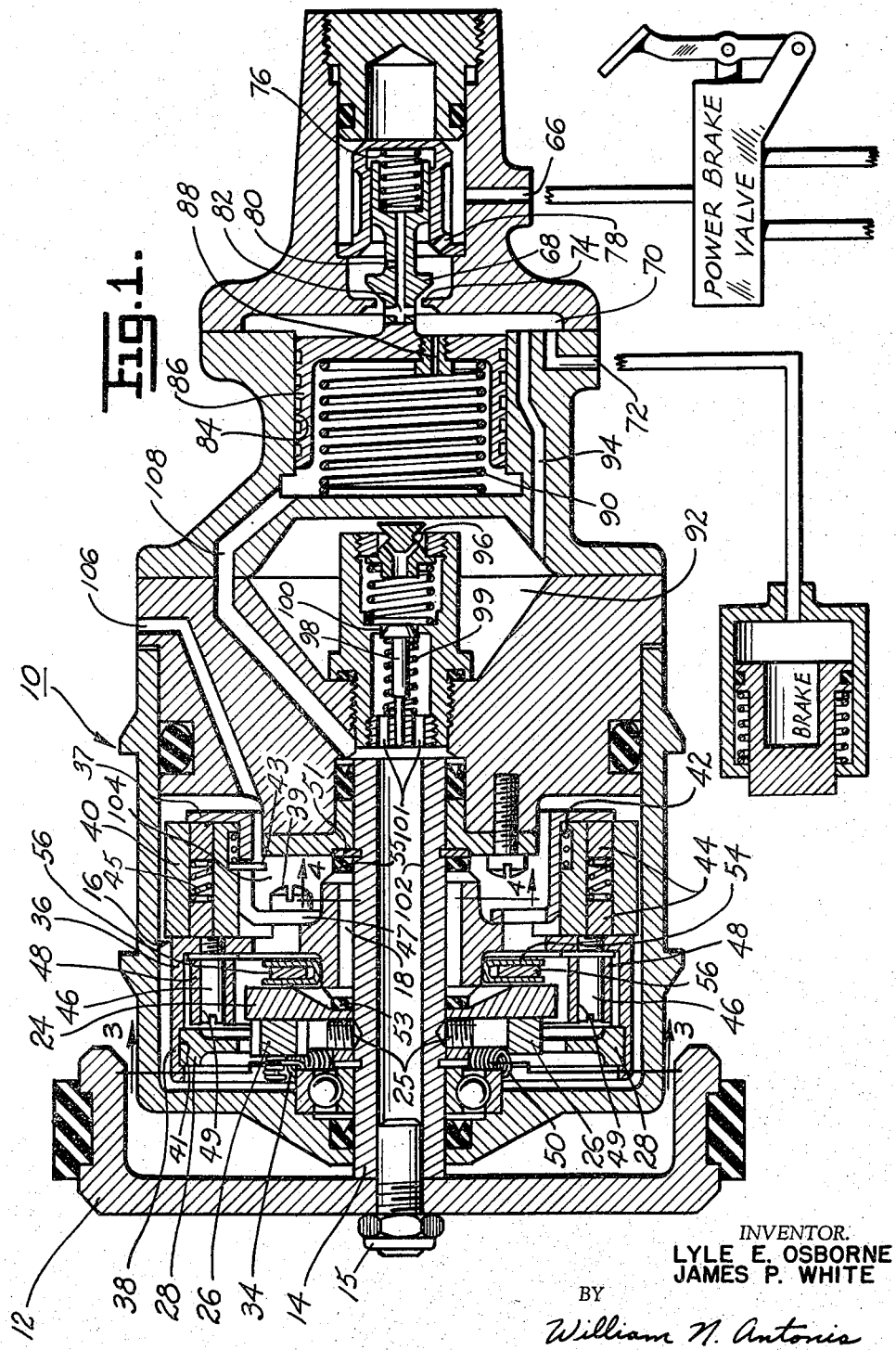

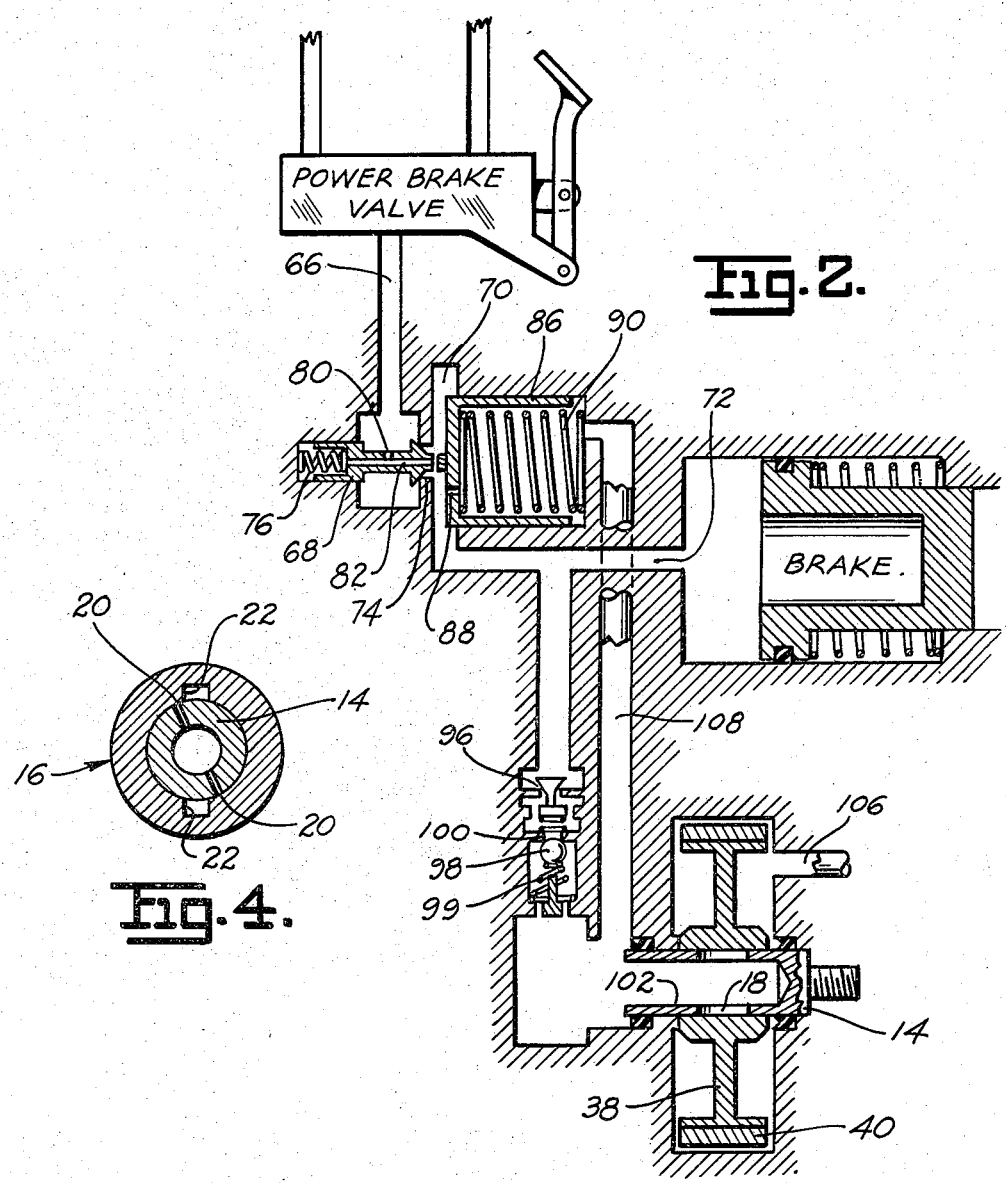

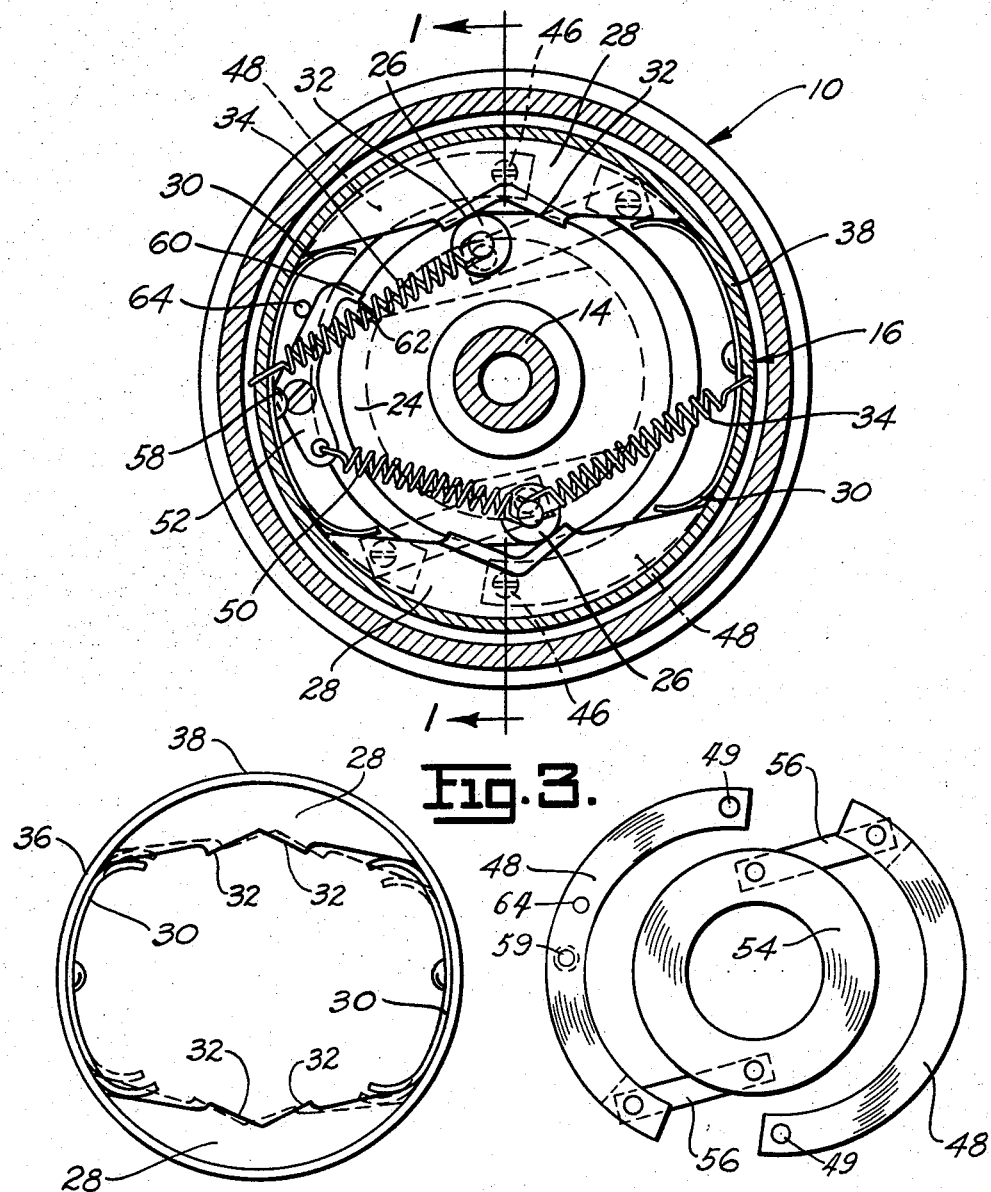

Sept. 27, 1960   L. E. OSBORNE ET AL   2,954,262
ANTI-SKID DEVICE

Filed June 26, 1957   6 Sheets-Sheet 5

INVENTOR.
LYLE E. OSBORNE
JAMES P. WHITE
BY
William N. Antonis
ATTORNEY.

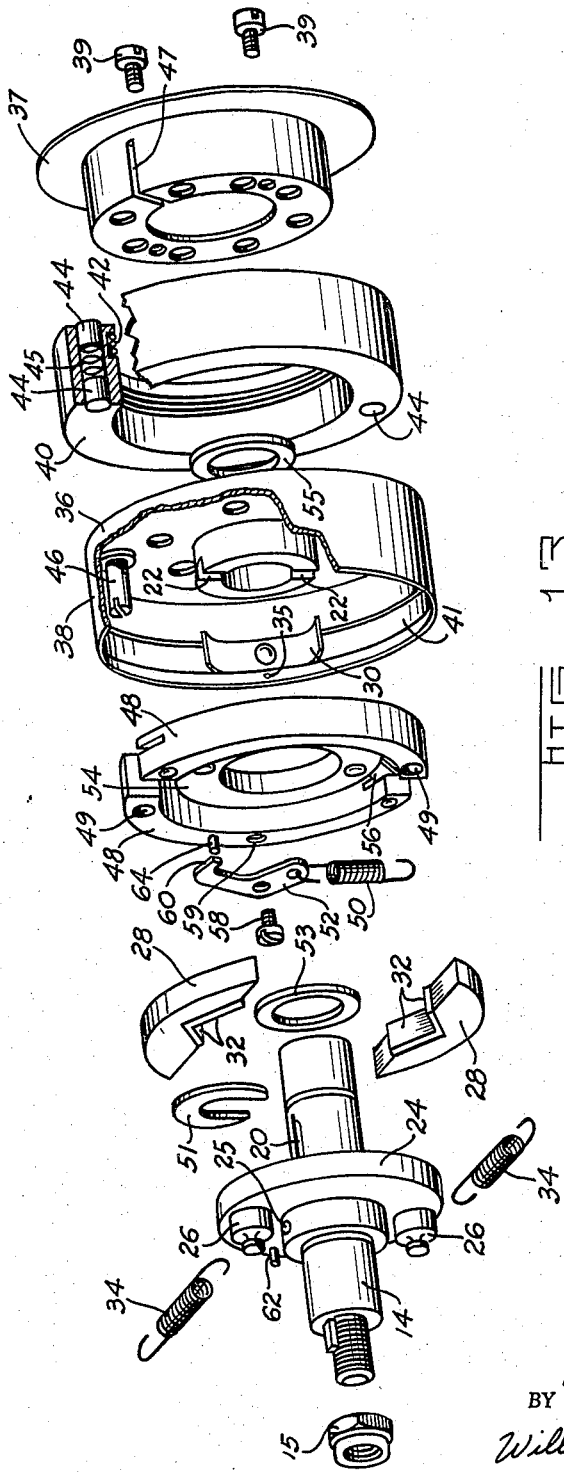

_United States Patent Office_

2,954,262
Patented Sept. 27, 1960

2,954,262

ANTI-SKID DEVICE

Lyle E. Osborne and James P. White, South Bend, Ind., assignors to The Bendix Corporation, a corporation of Delaware Filed June 26, 1957, Ser. No. 668,178

11 Claims. (Cl. 303—24)

This invention relates to an automatic fluid pressure regulating mechanism, and more particularly to improvements in an anti-skid device of the type disclosed in Lyle E. Osborne's copending application Serial No. 469,449.

The progress and development of larger, heavier, and faster aircraft has unquestionably increased the hazards of landing and stopping such aircraft. Automatic control of braking is especially advantageous in the case of such aircraft, since it is no longer possible for pilots to manually apply just the right amount of brake pressure to produce near maximum torque for all of the varying landing conditions. In order to avoid excessively long landing runs, a pilot may be required to apply an amount of braking pressure which might develop brake torque in excess of the torque developed between the tire and ground. Such a differential in torque may cause an incipient skid which will progress until the wheel becomes locked. Skidding causes excessive wear and frequently failure of tires. Loss of directional control may also result if the aircraft enters an uncontrolled skid. Moreover, a skidding wheel actually produces less frictional resistance, hence less deceleration of the aircraft, than a wheel braked just to the verge of skidding.

A mechanism which senses wheel deceleration and acceleration is disclosed in Osborne's copending application cited above. The basic method of operation of this mechanism and the one described hereafter is as follows: A rotating inertia element is driven by the airplane wheel and is arranged so that the inertia element may rotate with limited angular travel with respect to a drive shaft. Angular movement of the inertia element with respect to the shaft causes opening and closing of a brake release valve in such a manner that hydraulic brake pressure may be released and reapplied. The inertia element is spring loaded to hold it normally in the position which closes the brake release valve. In this position the brake may be applied and released normally. Deceleration of the airplane wheel at a rate exceeding a predetermined value is sensed by the inertia element which moves relative to the drive shaft thereby causing the brake release valve to open. This reduces hydraulic pressure on the brake and permits the airplane wheel to return to its original or "non-slip" speed. A hydraulic circuit used in conjunction with the brake release valve controls the release and reapplication of brake pressure with respect to time, to produce the desired effects during the various operating conditions. Hydraulic connections are provided to receive brake fluid under pressure from the brake control valve, to transmit pressure to the brake, and to conduct fluid released from the brake away from the anti-skid unit to the hydraulic fluid reservoir.

Our present invention is concerned chiefly with improvement modifications or control refinements wherein an automatic brake control apparatus is provided, which will operate effectively under the widely diverse airplane landing conditions which may arise and effect the control requirements.

One of the objects of our invention is to improve the reliability of the automatic brake control apparatus, and more particularly to eliminate a former limitation therein, resulting from the requirement that the inertia element be initially rotated by the spin up of the landing wheels in order to condition the mechanical inertia mechanism for skid-sensing operation. If the pilot applied the brakes and locked the landing wheels before or at initial ground contact, the wheels would immediately begin to skid and the inertia element would not have been rotated. Consequently, such a skid would not have been sensed.

Accordingly, our invention includes a locked wheel protection mechanism comprising a system of flybars, links and springs which lock the brake release valve in its open position so that if the brakes are applied during a landing prior to touch down of the wheels, the brake pressure will not be sufficient to prevent spin up of the wheels as contact is made with the runway. The mechanism, therefore, effectively makes it impossible for a pilot to lock and thereby accidently skid the wheels at the instant of initial ground contact.

A further and related object of our invention is to provide means whereby our locked wheel protection mechanism will automatically cease to function as soon as practicable after initial ground contact, so that automatically controlled braking will be restored. Accordingly, our locked wheel protection mechanism is designed so that it will not permit the closing of the brake release valve until the wheels have spun up and have accelerated to the ground speed of the aircraft and the inertia element in the anti-skid mechanism is no longer being accelerated.

A still further object of our invention is to provide a locked wheel protection mechanism which will prevent locking of a wheel if it should bounce free of the runway during landing, regardless of the interval of time elapsing between contacts of the wheel with the runway.

Another and important object of our invention is to provide an automatic anti-skid control which imposes its effect upon the pilot-controlled braking system in a manner conducive to maximum braking efficiency. It is important, therefore, that no time is unnecessarily lost between recovery of wheel speed after sensing and elimination of a tendency to skid, and restoration of brake pressure. It is also essential to proper control of tire slippage that braking pressure should not be restored too soon following release of the brakes in response to an incipient skid. If the brakes are reapplied much before the wheel recovers speed in these circumstances, a succeeding skid will tend to develop more quickly than if restoration of braking pressure is deferred until substantially full recovery of wheel speed has taken place. As a result, over a period of alternate relief and premature restoration of braking pressure, wheel speed progressively degenerates to a low value. Succeeding cycles of anti-skid operation which occur without the airplane wheel regaining ground speed between cycles is often referred to as a degenerative skid. since the mechanical wheel speed recovery mechanism may close the brake release valve somewhat in advance of the wheels attaining their full recovery speed, we have provided, in addition to the mechanical time delay provided by main and overrunning inertia elements, a hydraulic time delay which provides a slower rate of initial brake pressure application until the wheel reaches non slip speed thereby preventing a degenerative skid, and then a higher rate of brake pressure application after having reached non-slip speed in order to get a minimum loss of drag during any given cycle. Our hydraulic time delay consists essentially of a time delay piston which controls the opening of an inlet valve having an inlet orifice therethrough, said inlet orifice being in constant communication with the brake.

A further object of our invention is to provide means for yieldably connecting the inertia element of our anti-skid device with the driving means in order to prevent rapid opening and closing of the brake release valve following contact between metallic driving parts when the inertia element is alternately accelerated and decelerated. These yieldable means are essentially anti-rebound means which prevent excessive rapid acceleration of one metal part by another. Such excessive rapid acceleration would result because of the elastic properties of most metals and because of the relatively violent metal contacts which may occur.

A still further object is to provide an efficient anti-skid mechanism for aircraft which is relatively light and compact and which is cheaper to manufacture than prior mechanisms of this general nature.

The above objects, features, and advantages of our invention will become apparent from the following description taken in connection with the accompanying drawings which form a part of this invention and in which:

Figure 1 is a sectional view, taken along line 1—1 of Figure 3, showing our anti-skid device in conjunction with a power brake valve and a brake;

Figure 2 is a schematic drawing showing the anti-skid hydraulic system;

Figure 3 is a sectional view taken along line 3—3 of Figure 1;

Figure 4 is a sectional view of the rotary brake release valve taken along line 4—4 of Figure 1;

Figure 5 is a view showing the flybars and flybar linkage removed from the anti-skid mechanism;

Figure 6 is a diagrammatic view showing the relative movement occurring between the drive plates and main flywheel during acceleration or deceleration of the flywheel;

Figure 13 is an exploded diametric view of the inertia elements, locked wheel protection mechanism, and related parts.

Figure 7:
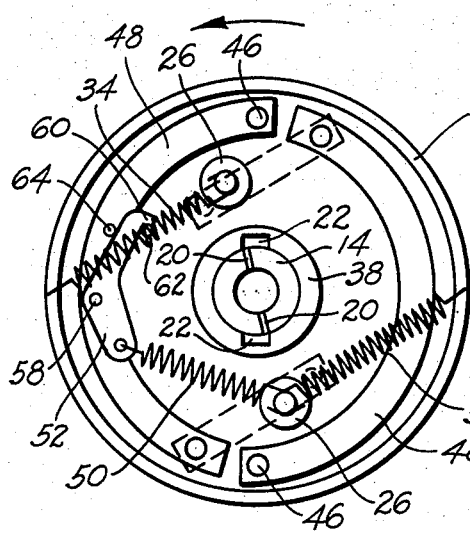
Figure 7 is a diagrammatic view showing a position of our locked wheel protection mechanism during speeds less than approximately 10 m.p.h. in which the flybars are "in" and the brake release valve is open due to an incipient skid but cannot be locked in the open position.

Referring to Figures 1 and 13, numeral 10 indicates our anti-skid device interposed in the hydraulic circuit between the power brake valve and the brake. A drive wheel 12 is operatively connected to a drive shaft 14 by suitable means such as nut 15 and is adapted to contact the rim of an airplane wheel (not shown), thereby causing drive shaft 14, which is mounted in suitable bearings, to rotate at a multiple of the wheel velocity. The device may also be mounted in the axle and driven at wheel speed. A flywheel 16 is mounted on the shaft 14 so that the mating surfaces of the shaft and flywheel form a rotary valve 18 which constitutes the brake release valve. Referring to Figure 4 it will be noted that the rotary valve includes registerable channels or slots 20 in the shaft and 22 in the flywheel. As the shaft 14 is rotated by the airplane wheel, corresponding angular rotation of the flywheel 16 is accomplished by driving the flywheel through collar 24 which is attached to shaft 14 by screws 25, drive pins 26 suitably attached to collar 24, drive plates 28, and anti-rebound leaf springs 30 which connect drive plates 28 to the flywheel. Relative angular movement between the shaft and flywheel is permitted by allowing a limited amount of drive pin movement between shoulders 32 formed on drive plates 28. Two tension or torque springs 34 attached on one end to flywheel 16 at points 35 and on the other end to drive pins 26 urge the flywheel 16 to a position wherein the slots 20 in the shaft 14 are not in alignment with the slots 22 in the flywheel. This of course would be the closed position of the rotary brake release valve 18. It is also conceivable that with slight redesigning, compression springs could be used in place of tension springs 34. The flywheel 16 consists of two members which shall be referred to as the main flywheel 36 having a rim 38 for receiving drive plates 28 in an annular groove 41 located on the inner side thereof, and the overrunning flywheel 40. It should be noted that the main flywheel 36 has an annular support member 37 attached thereto by suitable means such as screws 39 for maintaining the overrunning flywheel 40 in an operative position. The overrunning flywheel is arranged so that it can rotate independently of the main flywheel 36 except for the friction torque developed in one direction of rotation by a self-energizing clutch spring 42 having one end thereof 43 located in a slot 47 of the overrunning flywheel support member 37 and in the opposite direction of rotation by non-energizing spring loaded friction blocks 44. The spring loading is accomplished by spring 45 located between blocks 44. The flywheel unit 16 is held in assembled relationship with respect to the collar 24 through means of a C-washer 51 and two low-friction thrust washers 53 and 55, one of which is located between collar 24 and flywheel 36 and the other of which is located between flywheel 36 and C-washer 51.

Pivotally attached to the main flywheel 36 by flybar anchor pins 46 are flybars 48 having holes 49 for receiving the anchor pins 46, said flybars moving radially under the opposing influence of centrifugal force and a flybar and latch tension spring 50 which is connected to the end of a latch 52. The flybars 48 are interconnected by a linkage arrangement (shown in Figure 5) which prevents the flybars from moving radially independent of each other. This linkage arrangement includes a ring 54 and a pair of links 56 attached to the ring and to one end of each of the flybars. The latch 52 is attached to one of the flybars by a set screw 58 which is threaded into tapped hole 59 so that it may pivot about said screw. One end of the latch has a hook 60 formed thereon for engagement with a latch pin 62 mounted on collar 24 which, as previously stated, is rigidly fastened to the shaft 14. The spring 50, which is attached to the latch 52, tends to urge the latch in a direction so as to cause disengagement of the hook 60 from the latch pin 62. The latch remains disengaged from the latch pin as a result of the tension of spring 50 as long as the flybars are in their outermost position, that is, when the flybars are at the maximum distance from the shaft centerline. When the flybars are pulled inwardly under the influence of the flybar spring 50, the hook 60 on the latch can engage the latch pin 62. Anchor pin 64, which is connected to one of the flybars, prevents excessive rotation of the latch by spring 50, so that proper engagement will take place. When so engaged, the latch may prevent relative angular movement of the flywheel 16 with respect to the shaft 14. The latch mechanism is arranged so that it may lock the flywheel in a position wherein the rotary brake release valve 18 will be open or under certain circumstances prevent travel of the flywheel to a point where locking in the open position is possible. Movements of the latch mechanism will subsequently be explained in greater detail.

Figures 1 and 2 show a power brake valve which transmits pressurized fluid from a pressure source (not shown) to the brake via anti-skid inlet 66, hydraulically balanced inlet valve 68, chamber 70 and brake outlet 72. The inlet valve 68, which is urged against valve seat 74 by a spring 76, also contains by-pass means whereby a limited amount of fluid is permitted to flow from the power brake valve to the brake via opening 78, inlet orifice 80 and passage 82, even when the valve is seated on valve seat 74. Bore 84 which communicates with chamber 70 contains a time delay piston 86 having a time delay orifice 88 therein. One side of the piston is exposed to the fluid pressure existing on the brake while the other side abuts a spring 90 which urges the piston against inlet valve 68. Since the spring force behind the inlet valve is less than the opposing force of the time delay piston spring, the inlet valve will be unseated from its valve seat 74 as long as no skid is being detected by the anti-skid mechanism. A chamber 92 communicates with the brake via passage 94, chamber 70, and brake outlet 72, and with a reservoir (not shown) via a variable area flow control outlet orifice 96, a spring loaded pressure relief or priority valve 98 seatable on valve seat 100, openings 101 in the priority valve spring retainer, bore 102 formed in shaft 14, rotary valve 18; flywheel chamber 104 and reservoir return port 106. The outlet orifice 96 may also be controlled by a diaphragm valve of the type disclosed in Osborne's copending application Serial No. 469,449. A passage 108 communicates the bore 102 of shaft 14 with the bore 84.

Figure 9:
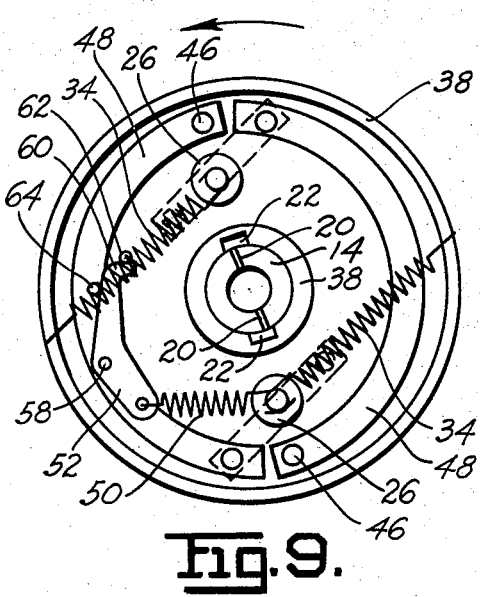
Figure 9 is a diagrammatic view, similar to Figure 7, showing the position of the mechanism for speeds less than approximately 7 m.p.h. in which the flybars are "in" and the brake release valve is locked in an open position so that effective braking pressure cannot be applied until the wheel has spun up and accelerated to the aircraft ground speed.

Operation of our anti-skid device is as follows:

Immediately after take-off, brake pressure is applied to anti-skid inlet 66 either manually by the pilot operating the power brake valve, or by some automatic means. This is done in order to prevent the locking of the aircraft wheels by premature actuation of the brake pedals during the subsequent landing of the aircraft. The application of pressure to the brake with the wheel spinning clear of the runway will be instantaneous, since the inlet valve 68 is open, and therefore will cause a sudden deceleration of the wheel. This deceleration when it exceeds the rate at which the flywheel torque springs 34 can decelerate the flywheel 36, will cause the drive shaft 14 to move with respect to the flywheel, thus opening the rotary brake release valve 18. There will then be a sudden reduction of pressure inside the bore 102 of shaft 14 and bore 84 which causes the time delay piston 86 to move inwardly against spring 90, since the brake pressure in chamber 70 would be of a greater magnitude. This inward movement of the piston 86 permits the hydraulically balanced inlet valve 68 to seat on valve seat 74 as a result of the force exerted by spring 76. The closing of the inlet valve 68 will take place prior to the opening of the priority valve 98 because springs 90 and 99 are preloaded so that the pressure differential across the time delay piston 86 required to move the piston against its spring 90, is less than the pressure required to unseat the valve 98 from its valve seat 100 by overcoming spring 99. After the inlet valve 68 has closed, fluid will flow from the brake to the reservoir (not shown) via the variable orifice 96, priority valve 98, openings 101, bore 102, rotary brake release valve 18, flywheel chamber 104, and reservoir return port 106, thereby allowing the pressure on the brake to decrease. The minimum pressure occurring at the brake at this time would be the pressure existing in the return line plus the opening pressure on the priority valve 98. This minimum pressure is maintained by calibrating the inlet valve orifice 80 and the time delay piston orifice 88 so that flow through the inlet valve orifice at any significant anti-skid inlet pressure is greater than the flow rate which exists through the time delay piston orifice. The minimum pressure maintained by the priority valve 98 causes a sufficiently rapid deceleration rate of the rotating airplane wheel to cause the rotary brake release valve 18 to remain in its open position. At the time of take-off the flybars 48 will be in their outermost positions as a result of the centrifugal forces acting thereon. When the aircraft wheel and drive shaft 14 are decelerated by the brake application, the loss in wheel r.p.m. reduces the centrifugal forces to a point where the flybar springs 50 can pull the flybars 48 inwardly thereby causing the latch 52 to assume a position whereby it abuts latch pin 62 as shown in Figure 9. The abutment of latch 52 with pin 62 locks the flywheel 36 and prevents it from returning to a position in which the rotary brake release valve 18 is closed. Consequently, the rotary brake release valve 18 is held in an open position after take-off by the locked wheel protection mechanism and the brake pressure cannot again be applied to the brakes until this rotary valve is closed by the "spin up" of the wheel at touch down during landing. Wheel snubbers may be used instead of a brake application to automatically decelerate the wheel and actuate the locked wheel protection mechanism.

Figure 10:
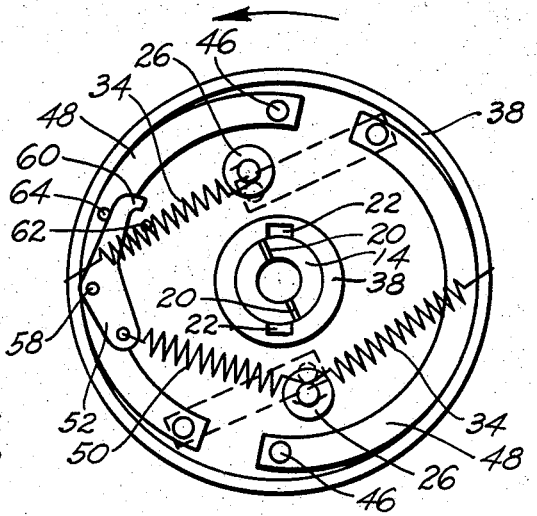
Figure 10 is a diagrammatic view, similar to Figure 7, showing the position of the mechanism for speeds more than 10 m.p.h. in which the flybars are "out" and the brake release valve is closed but will open if an incipient skid occurs.
Figure 11:
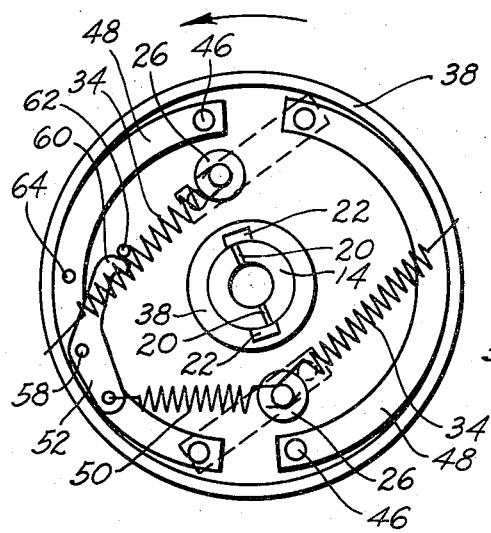
Figure 11 is a diagrammatic view, similar to Figure 7, showing the position of the mechanism during a period when the aircraft wheel is resuming non-slip speed after the brake release valve has been locked in an open position, as shown in Figure 9, in which the flybars are "out" and the brake release valve is still locked in the open position.

When the airplane is being landed, if the brake valve is operated prior to touch down of the wheel, brake pressure can be no greater than that allowed by the priority valve 98, since the rotary valve 18 will be in an open position as described in the previous paragraph. This brake pressure would not be sufficient to prevent spin up of the wheel as contact is made with the runway. As the wheel spins up, the drive shaft 14 is accelerated and the flywheel 36 in turn is caused to accelerate by the transmission of force from the latch pin 62 to the latch 52, to the flybar 48, and thence to the flywheel 36. This force is sufficient to hold the latch 52 in the locked position as shown in Figure 11 even though at relatively low speeds centrifugal force will cause outward movement of the flybars 48. When the acceleration of the wheel to ground speed is completed and the flywheel 36 is no longer being accelerated, the latch spring 50 will move the latch 52 away from the pin 62 and allow the flywheel torque springs 34 to return the flywheel 36 to a position in which the rotary brake release valve 18 is closed as shown in Figure 10. When rotary valve 18 closes, fluid can no longer flow out of the return port 106 and brake pressure will start to rise slowly due to flow through the inlet valve orifice 80. Simultaneously, the piston spring 90 will cause the time delay piston 86 to move toward the inlet valve 68 at a rate dependent upon the piston spring and the amount of restriction provided by the time delay orifice 88. When the piston has moved a sufficient distance to contact the inlet valve 68, the valve will start to open at a slower rate dependent upon the net spring force provided by the combination of opposing inlet valve and time delay piston springs 76 and 90. As the inlet valve is opened, fluid in larger quantities is allowed to flow from anti-skid inlet 66 to the brake, thereby increasing the brake pressure fairly rapidly.

Upon application of the brake, if the pressure at anti-skid inlet 66 is of a magnitude sufficient to cause too rapid a deceleration of the airplane wheel, thus producing an incipient skid condition, the wheel deceleration will cause the main flywheel 36 to overrun the drive shaft 14 against the force of the torque springs 34 a controlled amount thereby opening the rotary brake release valve 18. When the main flywheel 36 is decelerated by contact of the drive pins 26 with the drive plates 28, the overrunning flywheel remains at a higher velocity. The effect of the overrunning flywheel, at this time, is to produce a steady torque on the main flywheel tending to hold the main flywheel in a position which causes the rotary brake release valve 18 to remain open. As previously described in greater detail, due to the action of the priority valve 98, the opening of rotary brake release valve 18 will first reduce the pressure back of the time delay piston. The differential pressure across the piston plus the force of the inlet valve spring 76 will cause the piston to move away from the inlet valve 68 thereby permitting the valve to seat on valve seat 74. This sequence of events prevents further flow of fluid to the brake except for that which is permitted to pass through inlet orifice 80. The outlet orifice 96 and the priority valve 98 then "program" the release of fluid to the reservoir return port 106 via the open rotary valve 18 until the airplane wheel stops decelerating. As the airplane wheel ceases its deceleration and starts to accelerate, the main flywheel 36 is held in the brake released position (rotary valve 18 open) by the torque of the overrunning flywheel 40 until a sufficient acceleration rate has been reached to cause the inertia of the main flywheel to overcome the overrunning flywheel friction torque. The overrunning flywheel then serves to delay slightly the closing of the rotary brake release valve 18, in order to assure that the brake pressure will be released far enough to allow complete spin up of the airplane wheel to non-slip speed. After the rotary brake release valve 18 has closed, pressure is restored to the brake as described in the preceding paragraphs, and if sufficient brake pressure to produce an incipient skid is again reached, the cycle will be repeated. The time delay for brake reapplication following release due to incipient skid, and the rate at which pressure is reapplied to the brake by the inlet valve, is controlled to produce the desired relationship between brake pressure and airplane wheel speed such that no appreciable airplane drag is lost during the cycle and yet there is no tendency for brake pressure to come on too fast and cause degenerative skids. (A degenerative skid is defined as succeeding cycles of anti-skid operation which occur without the main wheel regaining ground speed between cycles.) The variable outlet orifice 96 is designed to provide a nearly uniform rate of flow of fluid out of the brake following opening of the brake release valve, in order that brake pressure may be released quickly to stop the incipient skid yet not so quickly that the brake pressure undershoots by an appreciable amount the pressure which is required to allow the wheel to resume non-slip speed.

Figure 8:
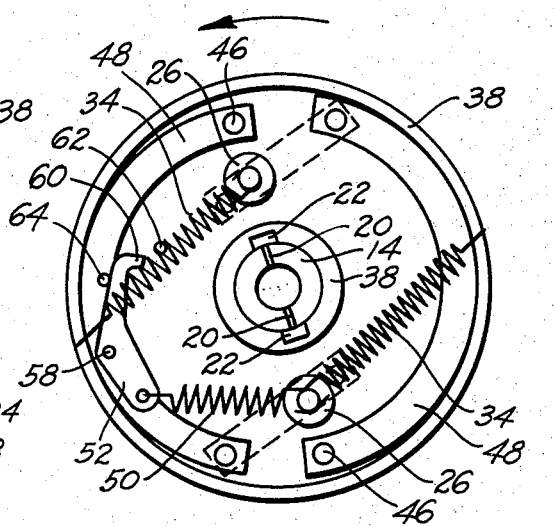
Figure 8 is a diagrammatic view, similar to Figure 7, showing the position of the mechanism for speeds above approximately 7 m.p.h. in which the flybars are "out" and the brake release valve is open due to incipient skid.

Locked wheel protection is provided by the system of flybars, links and springs which have previously been partially described with respect to take offs and landings and operate as follows: when the aircraft is rolling at speeds greater than approximately 10 m.p.h. and the rotary brake release valve 18 is closed, the flybars 48 will assume a position against the rim 38 of the flywheel as shown in Figure 10. This action disengages the latch 52 from the latch pin 62 and will allow relative rotation between the flywheel and shaft so that the rotary valve 18 can open in the event an incipient skid occurs as shown in Figure 8. If the landing gear wheel bounces free of the runway during landing, while brake pressure is applied; the wheel would normally tend to lock, but with our anti-skid locked wheel protection mechanism the brake pressure is released as follows: Due to centrifugal force, the flybars 48 will be in their outermost position. The deceleration of the wheel caused by the brake application will require my anti-skid device to cycle and reduce brake pressure. At this time the priority valve 98 maintains sufficient pressure to insure a certain amount of deceleration of the wheel while the wheel is airborne. The loss in wheel r.p.m. results in the reduction of centrifugal force and the spring 50 will return the flybar 48 and latch 52 to a position as shown in Figure 9, which will prevent the flywheel 36 from returning to a position wherein the rotary brake release valve would be closed. Brake pressure will be held off by the anti-skid device as shown in Figures 9 and 11 until contact with the ground causes the wheel to spin up to non-slip speed, at which time the centrifugal force of the flybars will have overcome the latch spring 50 and accelerating forces between the pin 62 and the latch will have closed, thereby, freeing the flywheel so that the springs 34 can return it to a position in which the rotary brake release valve 18 is closed, as shown in Figure 10.

Figure 12:
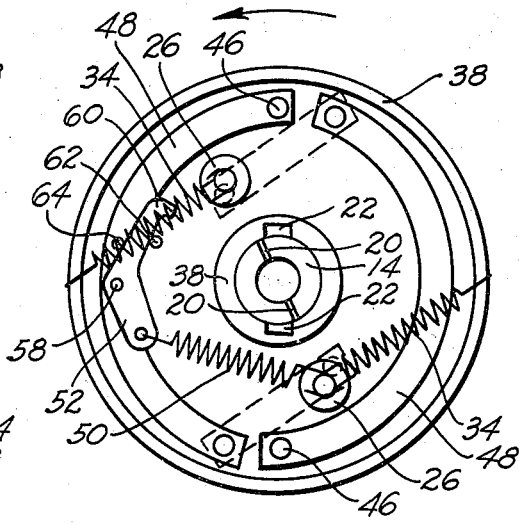
Figure 12 is a diagrammatic view, similar to Figure 7, showing the position of the mechanism for speeds less than approximately 10 m.p.h. in which the flybars are "in" and the brake release valve is closed but will open, as shown in Figure 7, if an incipient skid occurs.

When the airplane slows down to speeds below approximately 10 m.p.h., the rotational velocity of the flywheel 36 becomes small enough so that the flybar springs 50 can pull the flybars 48 inwardly away from the rim 38 of the flywheel and cause the latch 52 to engage the latch pin 62 as shown in Figure 12 thereby allowing relative movement between the flywheel and shaft to the extent shown in Figure 7 in order to permit the opening of the brake release valve in the event of an incipient skid, but preventing by means of hook 60 travel of the flywheel to the point where locking of the brake release valve in the open position would occur as shown in Figure 9. The purpose of this is to prevent locking of the flywheel in a position wherein rotary brake release valve 18 would be open as a result of a wheel deceleration with consequent loss of brakes. The design geometry of the locked wheel protection mechanism is such that the force of the flybar spring 50 is arranged so that there is a greater moment tending to pull the flybars in when the flywheel is in the brake "on" position than when it is in the brake "off" position. This assures that an incipient skid at low speed will always result in restoring brake pressure when the wheel resumes non-slip speed. In effect, the locked wheel protection mechanism is rendered inoperable when the wheel locks or nearly locks at speeds below approximately 10 m.p.h.

The purpose of the anti-rebound portion of our anti-skid mechanism is to prevent rapid opening and closing of rotary valve 18 following contact between the drive pins 26 and the drive plates 28 when the flywheel is alternately accelerated and decelerated. When the angular velocity of the drive shaft 14 is suddenly changed, which is often the case, there may be a considerable difference between the velocity of the shaft and the velocity of the flywheel at the moment of contact between the drive pins and the drive plates. Because of the elastic properties of most metals, such relatively violent contact may cause rebound of the flywheel. This rebound is prevented by leaf springs 30 which allow some angular movement between the shaft and flywheel during the time the flywheel is being accelerated or decelerated. In this manner the maximum force resulting from impact of the parts is greatly reduced. Referring to Figures 3 and 6 it can be seen that when the drive pins 26 contact the drive plate shoulders 32 a wedging action is created by the angle on the surface of the shoulder which contacts the drive pin. This forces the drive plates against the flywheel rim 38 so that a relatively high friction force is developed between the drive plates and flywheel rim to accelerate or decelerate the flywheel. The anti-rebound springs 30 resist movement of the drive plates, but need produce little force because of the wedging action, and thus cannot in themselves produce flywheel rebound.

Although our invention has been described in connection with a certain specific embodiment, the principles are susceptible of numerous other applications that will readily occur to persons skilled in the art. Having thus described the various features of our invention what we claim as new and desire to secure by Letters Patent is:

1. A device for automatically controlling braking pressure in an aircraft fluid pressure operated wheel brake comprising an inlet port, return port, and brake port, a spring loaded inlet valve having an inlet orifice therethrough connected between said inlet and brake ports for controlling flow therebetween, spring loaded time delay piston means operatively connected to and adjacent said inlet valve for urging said inlet valve towards an open position, driving means operatively connected to and rotatable by a wheel, rotatable flywheel means driven by said driving means, yieldable means connecting said flywheel means with said driving means, said flywheel means being capable of angular movement with respect to said driving means, means operatively connected to said driving means and flywheel means for limiting said angular movement, a rotary valve formed in said driving means and said flywheel means for communicating the brake port with said return port, said rotary valve being opened and closed by relative angular movement between said driving means and said flywheel means, means operatively connected to said driving means and flywheel means for urging said flywheel means to a position wherein said rotary valve is closed, a variable area flow control orifice and a spring loaded pressure relief valve connected between said brake port and rotary valve for controlling the flow therebetween, means communicating one side of said time delay piston means with said brake port and the other side thereof with said rotary valve, said time delay piston means moving in a direction away from said inlet valve at one rate when said rotary valve is open thereby permitting said inlet valve to close and moving in a direction toward said inlet valve at a lesser rate when said rotary valve is closed so that a predetermined time interval will elapse between the closing of said rotary valve and the opening of said inlet valve, said preload on said relief valve being greater than said preload on said time delay piston means so that opening of said rotary valve will result in equal differential pressures across said relief valve and piston means and cause movement of said piston means prior to movement of said relief valve thereby permitting said inlet valve to close before said relief valve opens and open after said relief valve closes, means operatively connected to said driving means and flywheel means for locking said rotary valve in an open position by preventing relative movement between said flywheel means and driving means, said locking means being operable by a reduction of centrifugal forces acting thereon, and means operatively connected to said wheel for decelerating the wheel after loss of ground contact to reduce the centrifugal forces acting on the locking means.

2. A device for automatically controlling braking pressure in an aircraft fluid pressure operated wheel brake comprising an inlet port, return port, and brake port, an inlet valve having an inlet orifice therethrough connected between said inlet and brake ports for controlling flow therebetween, driving means operatively connected to and rotatable by a wheel, rotatable flywheel means operatively connected to and driven by said driving means, said flywheel means being capable of angular movement with respect to said driving means, means operatively connected to said driving means and flywheel means for limiting said angular movement, a rotary valve formed in said driving means and said flywheel means for communicating the brake port with said return port, said rotary valve being opened and closed by relative angular movement between said driving means and flywheel means, means operatively connected to said driving means and flywheel means for urging said flywheel means to a position wherein said rotary valve is closed, means operatively connected between said brake port and rotary valve for controlling flow therebetween, and means operatively connected to said driving means and flywheel means for locking said rotary valve in an open position by preventing relative movement between said flywheel means and driving means, said locking means including flybar means connected to said flywheel means, a latch pivotally connected to said flybar means, and a latch pin mounted on said driving means, said flybar means and latch being movable to a position wherein said latch abuts said latch pin thereby preventing the closing of said rotary valve, said movement of said flybar means and latch being caused by a reduction of centrifugal forces acting thereon, and means operatively connected to said wheel for decelerating the wheel after loss of ground contact to reduce the centrifugal forces acting on the locking means.

3. A device for automatically controlling braking pressure in a fluid pressure operated wheel brake comprising an inlet port, return port, and brake port, a spring loaded inlet valve having an inlet orifice therethrough connected between said inlet and brake ports for controlling flow therebetween, spring loaded time delay piston means operatively connected to and adjacent said inlet valve for urging said inlet valve towards an open position, driving means operatively connected to and rotatable by a wheel, rotatable flywheel means operatively connected to and driven by said driving means, said flywheel means being capable of angular movement with respect to said driving means, means operatively connected to said driving means and flywheel means for limiting said angular movement, a rotary valve formed in said driving means and said flywheel means for communicating the brake port with said return port, said rotary valve being opened and closed by relative angular movement between said driving means and said flywheel means, means operatively connected to said driving means and flywheel means for urging said flywheel means to a position wherein said rotary valve is closed, a spring loaded pressure relief valve connected between said brake port and rotary valve for controlling the flow therebetween, said spring load on the relief valve resulting in operating pressures greater than the operating pressure produced by the spring load on said time delay piston means, passage means communicating one side of time delay piston means with said brake port and the other side thereof with said rotary valve, said time delay piston means moving in a direction away from said inlet valve at one rate when said rotary valve is open thereby permitting said inlet valve to close and moving in a direction toward said inlet valve at a lesser rate when said rotary valve is closed so that a predetermined time interval will elapse between the closing of said rotary valve and the opening of said inlet valve.

4. An automatic brake control device for an aircraft landing wheel comprising driving means operatively connected to and rotatable by said wheel, rotatable flywheel means driven by said driving means, yieldable means connecting said flywheel means with said driving means, said flywheel means being capable of angular movement with respect to said driving means as a result of acceleration or deceleration of said wheel, brake release valve means operatively connected to said driving means and flywheel means, said valve being automatically opened and closed by relative angular movement between said driving means and said flywheel means, means operatively connected to said driving means and flywheel means for urging said flywheel means to a position wherein said brake release valve means is closed, and centrifugally controlled locked wheel protection mechanism connected to said driving means and flywheel means for locking said brake release valve means in its open position by preventing relative angular movement between the driving means and flywheel means, said mechanism being actuated to a locked position by a reduction of centrifugal force caused by a retarding force exerted against said wheel immediately after loss of ground contact while the wheel is still spinning and deactuated from the locked position during subsequent ground contact after the wheel has spun up and accelerated to the ground speed of the aircraft.

5. A mechanism for automatically controlling braking pressure in an aircraft fluid pressure operated wheel brake comprising a drive shaft operatively connected to and rotatable by a wheel, rotatable inertia means operatively connected to and driven by said drive shaft, said inertia means being capable of angular movement with respect to said drive shaft, means operatively connected to said drive shaft and inertia means for limiting said angular movement, a valve formed in said shaft and said inertia means, said valve being adapted to be connected to a reservoir and to said brake and operated by relative angular movement between said drive shaft and said inertia means, said angular movement opening said rotary valve to relieve the braking pressure, means operatively connected to said drive shaft and inertia means for urging said valve to a closed position, means operatively connected to said drive shaft and inertia means for locking said valve in an open position by preventing relative movement between said inertia means and drive shaft, said locking means being actuated by a reduction of centrifugal forces acting thereon, and means operatively connected to said wheel for decelerating the wheel after loss of ground contact to reduce the centrifugal forces acting on said locking means.

6. An automatic brake control device for an aircraft landing wheel comprising inertia controlled skid-sensing means operatively connected to said wheel and requiring spin up of the wheel initially upon ground contact for enabling said skid-sensing means to function, brake releasing means operatively connected to and automatically opened by said skid-sensing means when the wheel begins to skid, said skid-sensing means being responsive to wheel acceleration after release of braking for restoring braking after the wheel recovers to the ground speed of the aircraft, and centrifugally controlled locked wheel protection mechanism operatively connected to said skid-sensing means and to said brake releasing means for locking said brake releasing means in its open position, said mechanism being actuated to a locked position by a retarding force exerted against said wheel immediately after loss of ground contact while the wheel is still spinning and deactuated from the locked position during subsequent ground contact after the wheel has spun up and accelerated to the ground speed of the aircraft.

7. An automatic brake control device as defined in claim 6 wherein said locked wheel protection mechanism includes means for preventing locking at low speeds.

8. An automatic brake control device for an aircraft landing wheel comprising, brake means for said landing wheel, skid-sensing means operatively connected to said brake means and wheel, said skid-sensing means being controlled by rotation of the landing wheel for selectively deactuating and actuating said brake means to automatically remove and restore braking of said wheel in response to skidding of the wheel and recovery of wheel rotational speed, respectively, and locked wheel protection mechanism operatively connected to said skid-sensing means and brake means for rendering said brake means ineffective thereby preventing locking of said wheel by premature braking thereof during the next landing, said mechanism being actuated by a reduction of centrifugal forces acting thereon immediately after loss of ground contact while the wheel is still spinning and automatically deactuated by centrifugal forces acting thereon after said wheel subsequently makes rolling ground contact and spins up to the ground speed of the aircraft.

9. A device for automatically controlling braking pressure in a fluid pressure operated wheel brake comprising an inlet port, return port, and brake port, inertia means operatively connected to and rotated by a wheel, valve means for relieving braking pressure communicating the brake port with said return port, said valve means being connected to and operable by said inertia elements, a spring loaded inlet valve having an inlet orifice therethrough connected between said inlet and brake ports for controlling flow therebetween, spring loaded time delay piston means operatively connected to and adjacent said inlet valve for urging said inlet valve towards an open position, passage means communicating one side of said time delay piston means with said brake port and the other side thereof with said valve means, opening of said valve means resulting in a differential pressure across said time delay piston means thereby causing said time delay piston means to move in a direction away from said inlet valve at one rate to permit said inlet valve to move towards a closed position, closing of said valve means resulting in movement of said time delay piston means in a direction toward said inlet valve at a lesser rate so that a predetermined time interval will elapse between the closing of said valve means and the complete opening of said inlet valve.

10. A device for automatically controlling braking pressure in a fluid pressure operated wheel brake comprising an inlet port, return port, and brake port, inertia controlled valve means communicating said brake port with said return port, said valve means being operatively connected to a wheel and opened by wheel deceleration forces to relieve braking pressure, an inlet valve connected between said inlet and brake ports for controlling flow therebetween, and time delay pressure responsive means operatively connected to and adjacent said inlet valve for urging said inlet valve towards an open position, said time delay pressure responsive means being responsive to the differential in pressure existing at said brake port and said valve means and being controlled by the operation of said valve means, said pressure responsive means moving in a direction away from said inlet valve at one rate when said valve means relieves braking pressure thereby permitting said inlet valve to close, and moving in a direction toward said inlet valve at a lesser rate when said valve means prevents further release of braking pressure so that a predetermined time interval will elapse between the prevention of further release of braking pressure by said valve means and the complete opening of said inlet valve.

11. A device for automatically controlling braking pressure in a fluid pressure operated wheel brake comprising an inlet port, return port, and brake port, valve means communicating said brake port with said return port, said valve means being operatively connected to a wheel and opened by wheel deceleration forces to relieve braking pressure, an inlet valve connected between said inlet and brake ports for controlling flow therebetween, and pressure responsive means operatively connected to said inlet valve for controlling movement of said inlet valve, said pressure responsive means communicating with and being responsive to the differential in pressures existing at said brake port and valve means and being operable by opening and closing of said valve means.

References Cited in the file of this patent

UNITED STATES PATENTS

| 2,633,830 | McCourty et al. | Apr. 7, 1953 |
| 2,776,027 | Pendlebury | Jan. 1, 1957 |
| 2,818,244 | Ropar | Dec. 31, 1957 |